3,298,910
METHOD FOR PROTECTING AGAINST FUNGI WITH PYOLUTEORIN
Richard J. O'Connor, John M. Van Deren, Jr., and Walter A. Darlington, St. Louis, Mo., assignors to Monsanto Chemical Company, St. Louis, Mo., a corporation of Delaware
No Drawing. Filed July 3, 1963, Ser. No. 292,755
3 Claims. (Cl. 167—33)

This invention relates to fungicidal compositions of 2-(2,6-dihydroxybenzoyl)-x,x'-dichloropyrrole and to a method of using this compound to kill or inhibit the growth of fungi.

The compound 2-(2,6-dihydroxybenzoyl)-x,x'-dichloropyrrole is known in the art as Pyoluteorin, an antibiotic, [Takeda, R., (1958), Structure of a New Antibiotic, Pyoluteorin; Journal of the American Chemical Society, 80, 4749]. It is stated in the art that this antibiotic, although very active on bacteria, has no activity on fungi or yeast [Takeda, R., (1958), Pseudomonas Pigments. I. Pyoluteorin, A New Chlorine-Containing Pigment Produced by *Pseudomonas aeruginosa;* Hakko Kogaku Zasski, 36, 281. C.A. 53, 8279g (1959)]. Contrary to the teachings of the art we have found that Pyoluteorin is active against fungi and is especially suitable for treating plants to kill or inhibit the growth of fungi.

It is an object of this invention to provide new fungicidal compositions.

It is another object of this invention to provide a new method of killing fungi.

It is another object of this invention to provide a new method of killing fungi on plants.

These and other objects of the invention will become apparent as the detailed description of the invention proceeds.

The invention will be more clearly understood from the following detailed description of specific examples thereof.

*Example 1*

This example describes an evaluation of Pyoluteorin as a fungistat. Pyoluteorin was mixed in a predetermined concentration with agar, inoculated with *Aspergillus niger* and incubated for five days. The concentration of the Pyoluteorin in the mixture was 1000 parts per million, and the growth of the fungi was completely inhibited.

*Example 2*

In this experiment spores of the fungus organism *Phytophthora infestans* were grown on lima bean agar slants for a period of nine days. At the end of this nine day period the fungus spores were washed with water from the mycelia on the agar to provide a concentrate of fungus spores in the water. Glass slides having depressions therein were prepared and to the depressions in the slides were added either dilute solutions of suspensions of Pyoluteorin or the same solvent medium minus the chemical. To the depressions in the glass plates were then added portions of the fungus spores suspended in water. The concentration of the test chemical in the water and fungus spores suspension in the depression was about 1 part per million. These slides were then placed in Petri plates containing small amounts of water and the slides were incubated overnight at about 70 to 75° F. The next day the slides were examined to determine the amount of germination of the fungus spores. When the slides not containing chemical were examined, i.e. the control slides, it was noted that the fungus spores had germinated to the extent of about 95 to 99%; whereas when the slides containing the Pyoluteorin were examined it is noted that there was no germination of the fungus spores.

*Example 3*

This example illustrates the foliage protectant properties of Pyoluteorin. Pyoluteorin in dilute solution or suspension was sprayed on the foliage of four week old tomato plants. Twenty-four hours later inoculum in form of zoospores of *Phytophthora infestans* was sprayed on the tomato plants. The plants were then incubated for 24 to 48 hours in a constant temperature humidity chamber and were transferred to the greenhouse where readings were made. For comparison control tests were set up wherein the tomato plants are sprayed with the solvent or suspending medium in the absence of the test chemical and were inoculated in the same way with the fungus organism. Disease incidence and phytotoxicity readings were made seven days after inoculation with the fungus organism. The scales for these readings are as follows:

| Disease Rating | Disease Index | Phytotoxicity | Phytotoxicity Index |
|---|---|---|---|
| None | 1 | None | 1 |
| Very slight | 2 | Very slight | 2 |
| Moderate | 3 | Moderate | 3 |
| Severe | 4 | Severe | 4 |
| Very severe | 5 | Plant dead | 5 |

At concentrations as low as 10 parts per million of Pyoluteorin, the disease rating was 3 and the phytotoxic rating was 1; whereas on the control plants the disease rating was 5 and the phytotoxic rating 1. Such fungicidal activity is equivalent to that of the commercial fungicide Zineb.

Thus it is seen that Pyoluteorin is a potent fungistat. Usually Pyoluteorin will be applied as a fungistat at concentrations in the range of about 0.0001% to 1.0%, preferably 0.001% to 0.1%, suspended, dispersed or dissolved in an inert carrier. Suitable compounding of Pyoluteorin is discussed in detail hereinbelow. Pyoluteorin is particularly useful for the prevention and control of decomposition and decay caused by mildew, molds, and other non-chlorophyll containing plants. Thus, for example, this chemical can be used for the protection of organic materials subject to deterioration by rotting, such as leather, fur, pulp, paper, textiles, rope, rubber, latex, plastics and paint. Incorporation of protective fungistats in such organic materials is especially desirable when they are exposed to conditions favorable to fungus growth. Thus, for example, Pyoluteorin can be used to protect textiles exposed to damp, as under tropical conditions, or in the case of lawn furniture, awnings, etc.; or Pyoluteorin can be used in marine paints and lacquers subject to algal and fungal attack, etc. Pyoluteorin is especially suitable for treating fruits and vegetables for protection against fungus organisms.

Pyoluteorin can be applied directly to the material to be treated, e.g. by incorporation in a disinfectant soap or antiseptic cream. However, since Pyoluteorin is extremely effective in dilute concentrations, for most applications it is preferred to incorporate it in a carrier or diluent. The choice of diluent is determined by the use of the composition as is the concentration of the active ingredient in the diluent. Thus by admixture with an inert pulverulent carrier such as talc, bentonite, kieselguhr, diatomaceous earth, etc. there can be prepared compositions suitable for admixture with seeds and so forth. Solutions can be made in organic solvents such as ether, acetone, benzene, chloroform, ethanol, ethyl acetate and the like, and these solutions can be used to apply the Pyoluteorin as a spray or impregnating bath if desired, with the use of pressure to facilitate penetration of the solution for treatment of cellulosic materials to produce, for example, rot proofing. Suitable formulations and applications of the Pyoluteorin to articles subject to fungicidal attack are also prepared by mixing the Pyoluteorin with an emulsifying agent suitably in the presence of organic solvents and then diluting with water to form aqueous emulsions containing the Pyoluteorin. Pyoluteorin is slightly soluble in water. Suitable emulsifying agents include, e.g. alkylbenzenesulfonates, polyalkylene glycols, salts of sulfated long-chain alcohols, sorbitan fatty acid esters, etc. Other emulsifying agents which can be used to formulate emulsions of the present compounds are listed in U.S. Department of Agricultural Bulletin E 607. In other embodiments of this invention standard paint formulations can be used as diluent or carrier for the Pyoluteorin; the Pyoluteorin can assist in preventing mold growth, e.g. for example in casein paints and the paints can also be applied to the surfaces which are thereby rendered resistant to the growth of lower organisms. The Pyoluteorin can be admixed with carriers which are active of themselves, for example with hormones, with buffering and/or softening agents, etc.

While the invention has been described in terms of specified embodiments which are set forth in considerable detail, it should be understood that this is by way of illustration only and that the invention is not necessarily limited thereto since alternative embodiments will become apparent to those skilled in the art in view of this disclosure. Accordingly, modifications are contemplated which can be made without departing from the spirit of the described invention or of the scope of the appended claims.

What is claimed is:

1. A method of inhibiting the growth of fungi on plants comprising treating plants with a sufficient amount to inhibit fungi growth of 2-(2,6-dihydroxybenzoyl)-x,x'-dichloropyrrole.

2. A method of inhibiting the growth of fungi on articles subject to deterioration by rotting comprising treating said articles with 2-(2,6-dihydroxybenzoyl)-x,x'-dichloropyrrole in an amount sufficient to inhibit fungal growth.

3. A method according to claim 2 wherein said 2-(2,6-dihydroxybenzoyl)-x,x'-dichloropyrrole is applied to said articles by prior incorpoartion into a protective coating for said articles.

References Cited by the Examiner

Chem. Abst., vol. 53 (1959), pp. 8279–8280.
J.A.C.S., vol. 80 (1959), pp. 4749–4750.

SAM ROSEN, *Primary Examiner.*
JULIAN S. LEVITT, G. A. NENTIS,
*Assistant Examiners.*